(12) United States Patent
Hyslop

(10) Patent No.: US 8,091,912 B2
(45) Date of Patent: Jan. 10, 2012

(54) FLOATING BOAT TRAILER

(76) Inventor: William J. Hyslop, Coatesville, IN (US)

( * ) Notice: Subject to any disclaimer, the term of this patent is extended or adjusted under 35 U.S.C. 154(b) by 0 days.

(21) Appl. No.: 12/842,351

(22) Filed: Jul. 23, 2010

(65) Prior Publication Data

US 2010/0289247 A1    Nov. 18, 2010

Related U.S. Application Data

(63) Continuation-in-part of application No. 12/267,181, filed on Nov. 7, 2008, now Pat. No. 7,780,182, which is a continuation-in-part of application No. 11/735,650, filed on Apr. 16, 2007, now Pat. No. 7,455,310.

(60) Provisional application No. 60/792,898, filed on Apr. 18, 2006.

(51) Int. Cl.
*B60P 3/10* (2006.01)
(52) U.S. Cl. .................. 280/414.1; 280/455.1
(58) Field of Classification Search .............. 280/414.1, 280/414.3, 455.1
See application file for complete search history.

(56) References Cited

U.S. PATENT DOCUMENTS

| 3,552,771 | A | | 1/1971 | Hendricks | |
|---|---|---|---|---|---|
| 4,052,085 | A | | 10/1977 | Rendessy | |
| 4,099,279 | A | * | 7/1978 | Park | 114/344 |
| 4,275,897 | A | | 6/1981 | Moyer | |
| 4,395,185 | A | * | 7/1983 | Whaley | 414/483 |
| 4,463,965 | A | | 8/1984 | Lawson | |
| 4,626,162 | A | * | 12/1986 | Parisi | 414/479 |
| 5,165,706 | A | * | 11/1992 | Fond | 280/414.1 |
| 5,228,713 | A | * | 7/1993 | Kovach | 280/414.1 |
| 5,320,058 | A | * | 6/1994 | Reed | 114/344 |
| 5,868,414 | A | | 2/1999 | McCoy et al. | |
| 6,598,896 | B1 | * | 7/2003 | Hyslop | 280/414.1 |
| 6,685,209 | B1 | * | 2/2004 | Guio | 280/414.1 |
| 7,029,020 | B2 | | 4/2006 | Adams | |

* cited by examiner

*Primary Examiner* — Tony H. Winner
(74) *Attorney, Agent, or Firm* — Woodard Emhardt Moriarty McNett & Henry LLP

(57) ABSTRACT

A boat towing system for towing a boat behind a vehicle comprising a boat trailer having a frame constructed and arranged with a first portion and a second portion that are pinned together to permit one section to move relative to the other section. The second portion is constructed and arranged to accommodate floatation panels. A spring biased buckle is mounted on the second portion and has a strap which has a hooked portion on its distal end. The boat towing system further comprises an attachment mount connected to the vehicle.

13 Claims, 19 Drawing Sheets

FLOATING BOAT TRAILER

CROSS REFERENCES TO RELATED APPLICATIONS

The present application is a Continuation-in-Part of application Ser. No. 12/267,181, filed Nov. 7, 2008 now U.S. Pat. No. 7,780,182, which is a Continuation-in-Part of application Ser. No. 11/735,650, filed Apr. 16, 2007, now U.S. Pat. No. 7,455,310, which claims the benefit of U.S. Provisional Patent Application Ser. No. 60/792,898, filed Apr. 18, 2006, which are hereby incorporated by reference in their entireties.

BACKGROUND OF THE INVENTION

When an automatic latching device is used or is not used as part of a boat trailer, the boat needs to be propelled up onto the trailer with sufficient speed and momentum to engage the bow roller or an automatic latching device. The typical approach is to keep the trailer on the loading ramp and the back half under the water. This then requires more speed or momentum for the boat to reach the bow roller or automatic latching device as the boat has to be driven up the incline of the trailer. This in turn causes added wear on the automatic latching device due to the impact force.

It would be an improvement to the typical boat loading procedure when an automatic latching device is used to be able to float the trailer in the water so that less speed and less momentum is required to ramp the boat onto the trailer and engage the automatic latching device. In fact, the boat, while at idle speed, can be loaded onto the trailer and engage the automatic latching device with a minimal impact force. By floating the trailer in the water, the buoyancy of the boat is maintained throughout a majority of the loading process and this further contributes to the fact that there is less of an impact force on the automatic latching device and the boat hull.

However, if low water conditions exist at the loading ramp, the boat trailer wheels can still be in contact with the river bed or the loading ramp surface when the boat trail is in the maximum back-in position and not floating.

By using air springs in the trailer suspension system, the trailer frame is lowered when the air pressure is exhausted and boat keel pressure is applied to the trailer back keel roller. This can be accomplished by connecting the air spring air supply to the trailer tongue cylinder rod extending air supply. When the trailer tongue cylinder air supply is reversed, so as to lower the hinge and the front portion of the trailer frame, the air springs air supply would be exhausted. A suitable air spring for this application is offered by Firestone under their "SPORT-RITE" brand, with a six inch stroke.

However, a floating boat trailer may still face certain difficulties. For example, when launching a boat from a floating boat trailer, cross winds, river currents or boat wakes may exert perpendicular forces on the trailer itself. These external forces create an undesirable situation as it is important during the loading and launching process to maintain the launching vehicle and trailer in a relatively straight line. Therefore, it would be an improvement to provide a floating boat trailer capable of resisting the forces described above in order to allow for safe and effective loading and launching of a boat.

BRIEF SUMMARY

The present disclosure provides an improved boat trailer and boat towing system. The claims, and only the claims, define the invention.

A boat towing system for towing a boat behind a vehicle comprising a boat trailer having a frame constructed and arranged with a first portion and a second portion that are pinned together to permit one section to move relative to the other section. The second portion is constructed and arranged to accommodate floatation panels. A spring biased buckle is mounted on the second portion and has a strap which has a hooked portion on its distal end. The boat towing system further comprises an attachment mount connected to the vehicle.

One object of the present disclosure is to provide an improved boat trailer and boat towing system.

DETAILED DESCRIPTION

Figure 1:
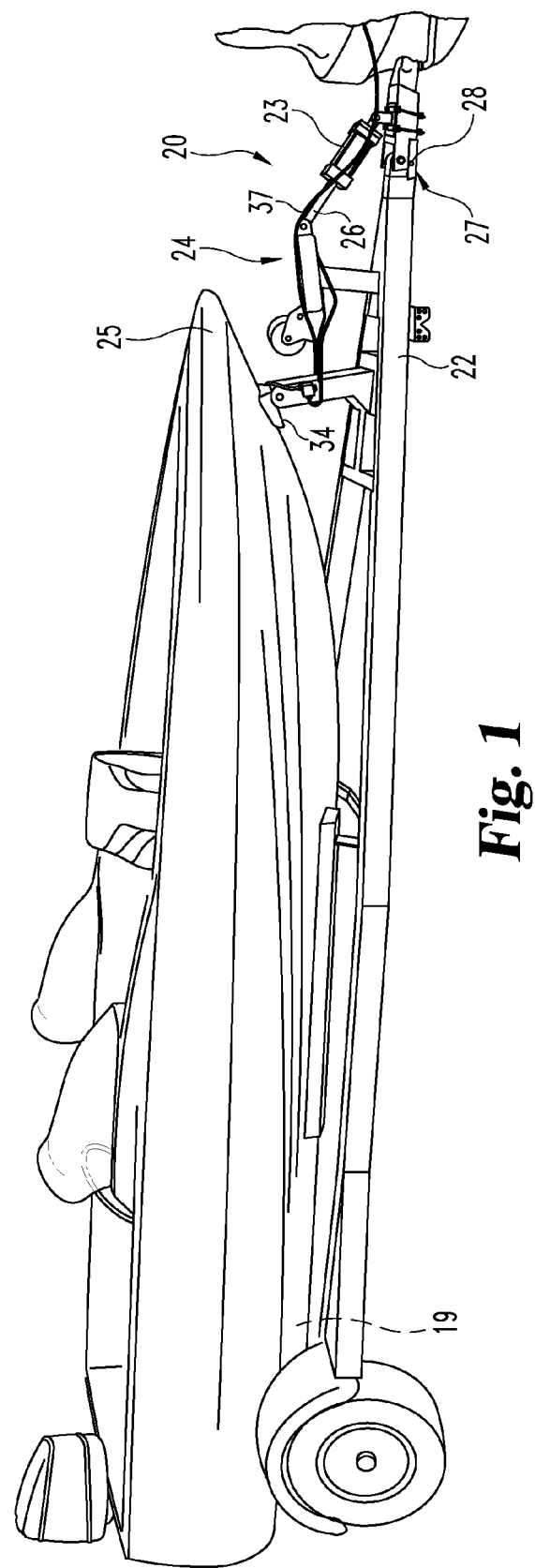
FIG. 1 is a perspective view of a floating boat trailer, with a boat thereon, according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a floating boat trailer 20 according to one embodiment of the present disclosure. Boat trailer 20 is constructed of tubular metal material. Two floatation panels 19 are located at the rear of the trailer, inside the frame and under the guide rail bunkers (see FIG. 2). Each floatation panel 19 is a relatively large panel of floatation material securely attached to the frame of the trailer adjacent the wheels and below the guide rails 33 and 33a. Each floatation panel 19 is an encased "block" of styrofoam that is sized for the size and weight of the corresponding trailer considering the necessary buoyancy. The styrofoam block can be a single piece or made up of multiple panels. In the disclosed embodiment, each panel 19 measures 2 feet by 4 feet by 4 inches. The encasing structure is constructed and arranged with straps or brackets or similar structures to facilitate secure attachment to the frame. The specific design for these attachment accessories depends on the specific construction of the corresponding trailer.

Figure 7:
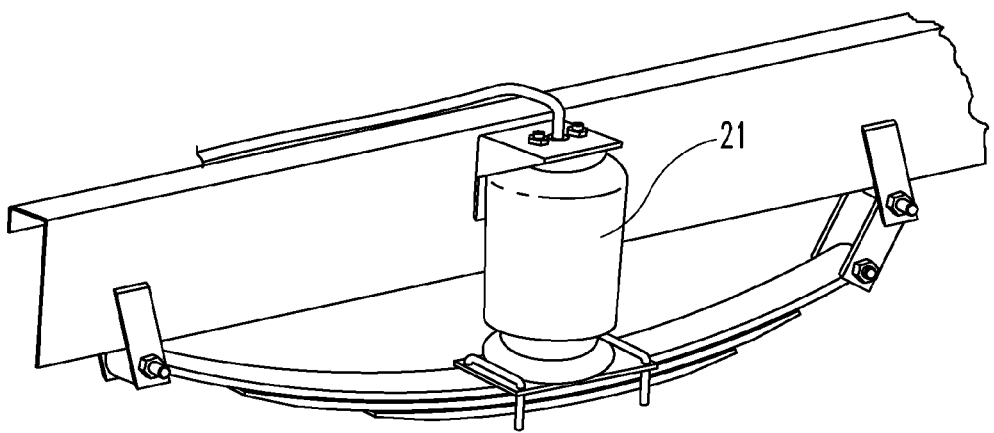
FIG. 7 is a perspective view of an air spring suspension system comprising part of the FIG. 1 floating boat trailer.

An air compressor and solenoid valve components can be constructed and arranged as part of the trailer tongue 22. High pressure hoses 37 connect the air compressor and solenoid valve to the tongue-mounted air cylinder 23 and the air springs 21 (see FIG. 7). The trailer tongue is hinged at hinge location 27 and the air cylinder 23 is connected between the tongue 22 and the winch stand 24 (see FIG. 3). A hydraulic system could be used to provide the required operating pressure. However, the air cushion feature provided by the pneumatic cylinder would not be available.

Figure 6:
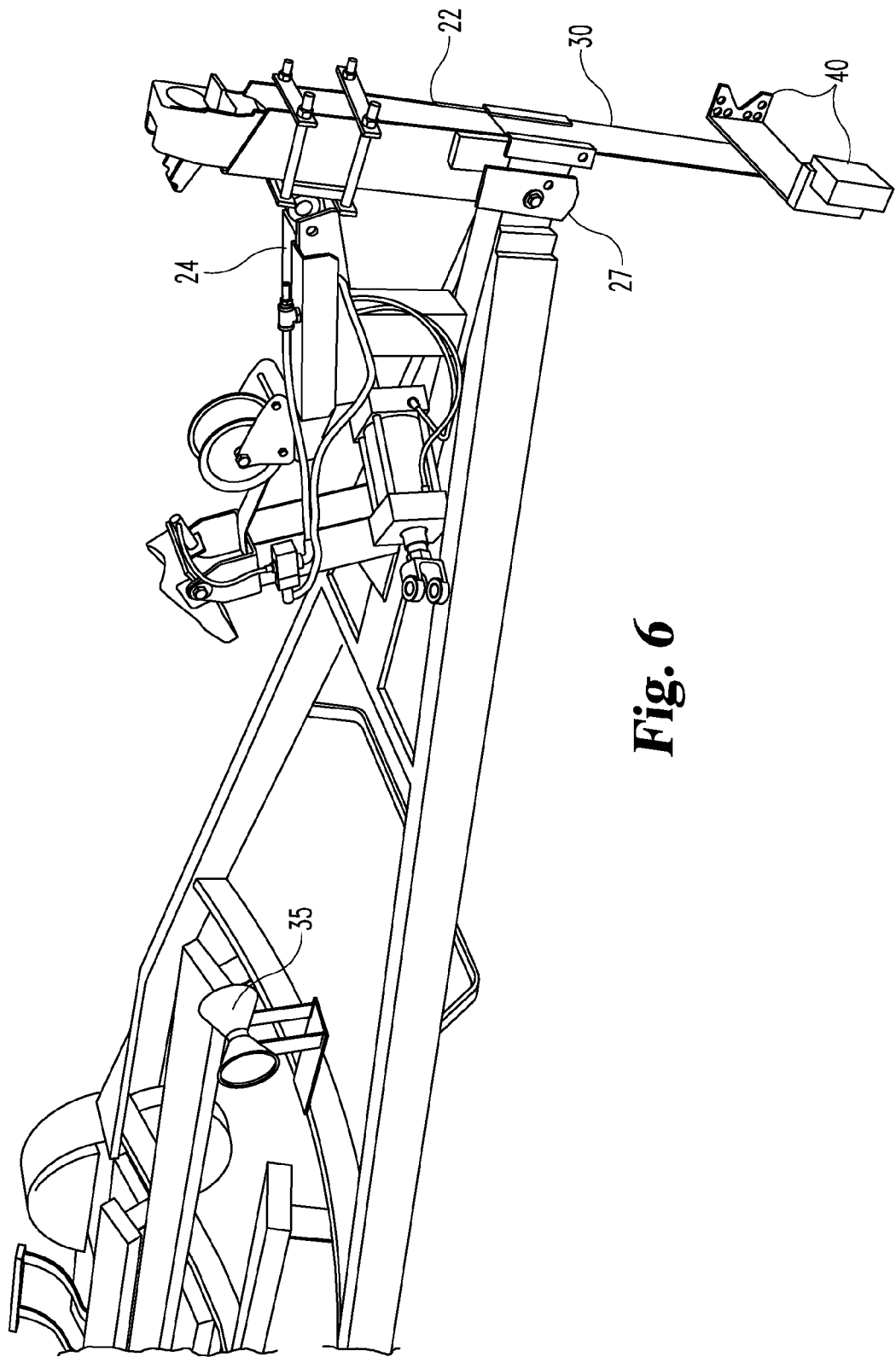
FIG. 6 is a partial, perspective view of the FIG. 1 floating boat trailer as arranged for storage.

FIG. 6 represents storage options for the trailer tongue 22 and winch stand 24 when the boat and trailer are being stored during the "off season". In FIG. 6, the trailer tongue 22 can be raised upright, to vertical, and this reduces the overall length, thereby facilitating storage.

Figure 2:
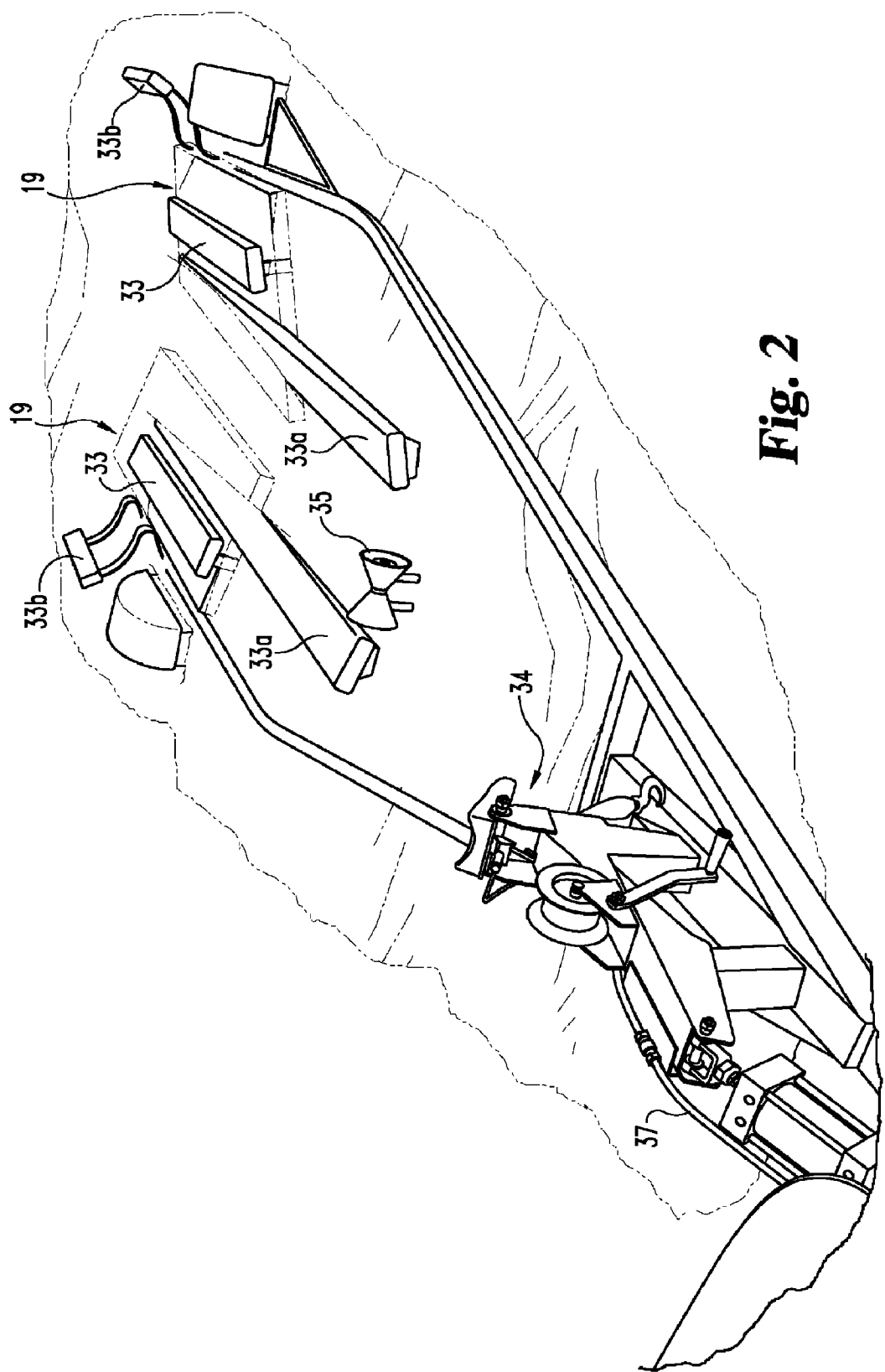
FIG. 2 is a partial, perspective view of the FIG. 1 floating boat trailer, without the boat.
Figure 3:
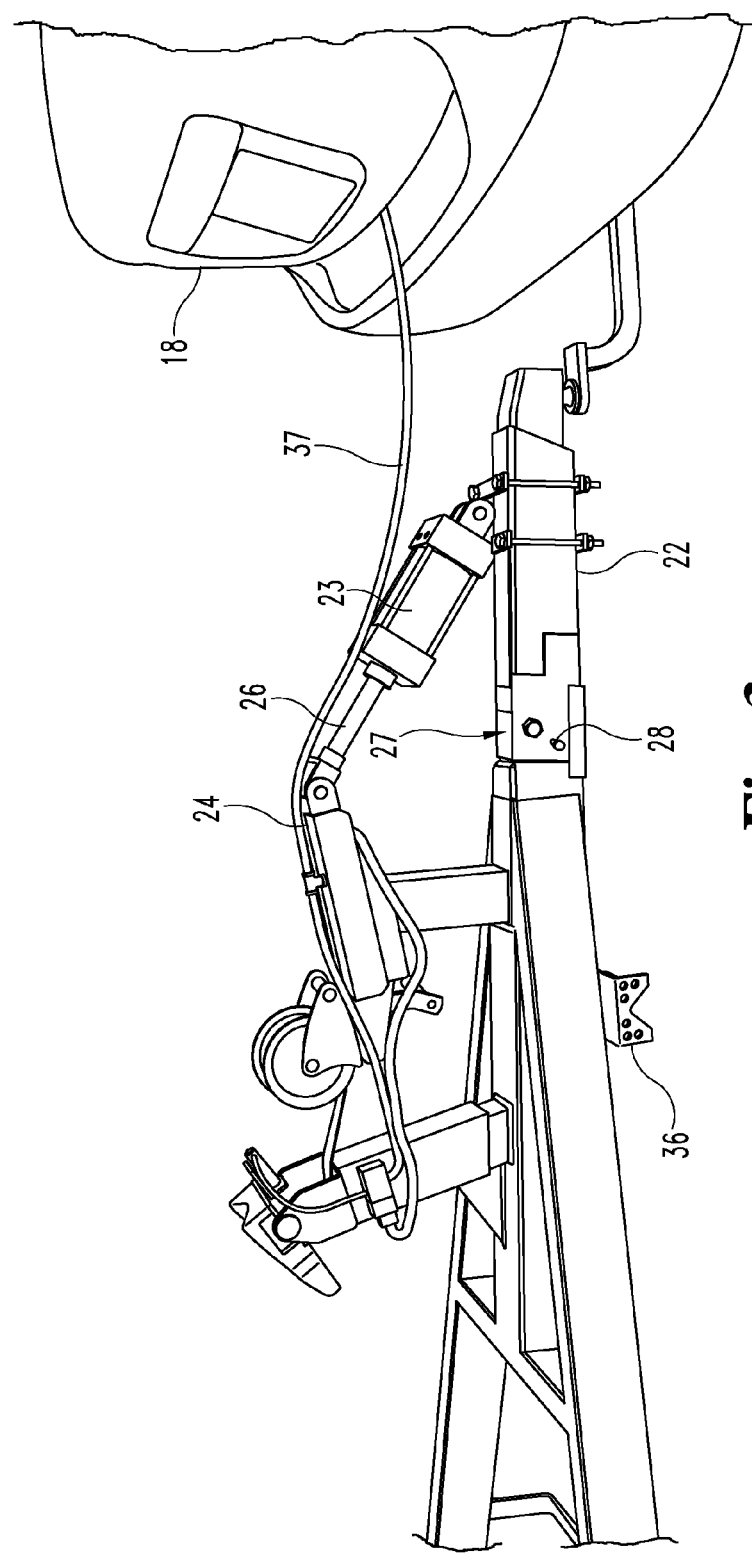
FIG. 3 is a partial, perspective view of the FIG. 1 floating boat trailer prior to being deployed into the water.
Figure 4:
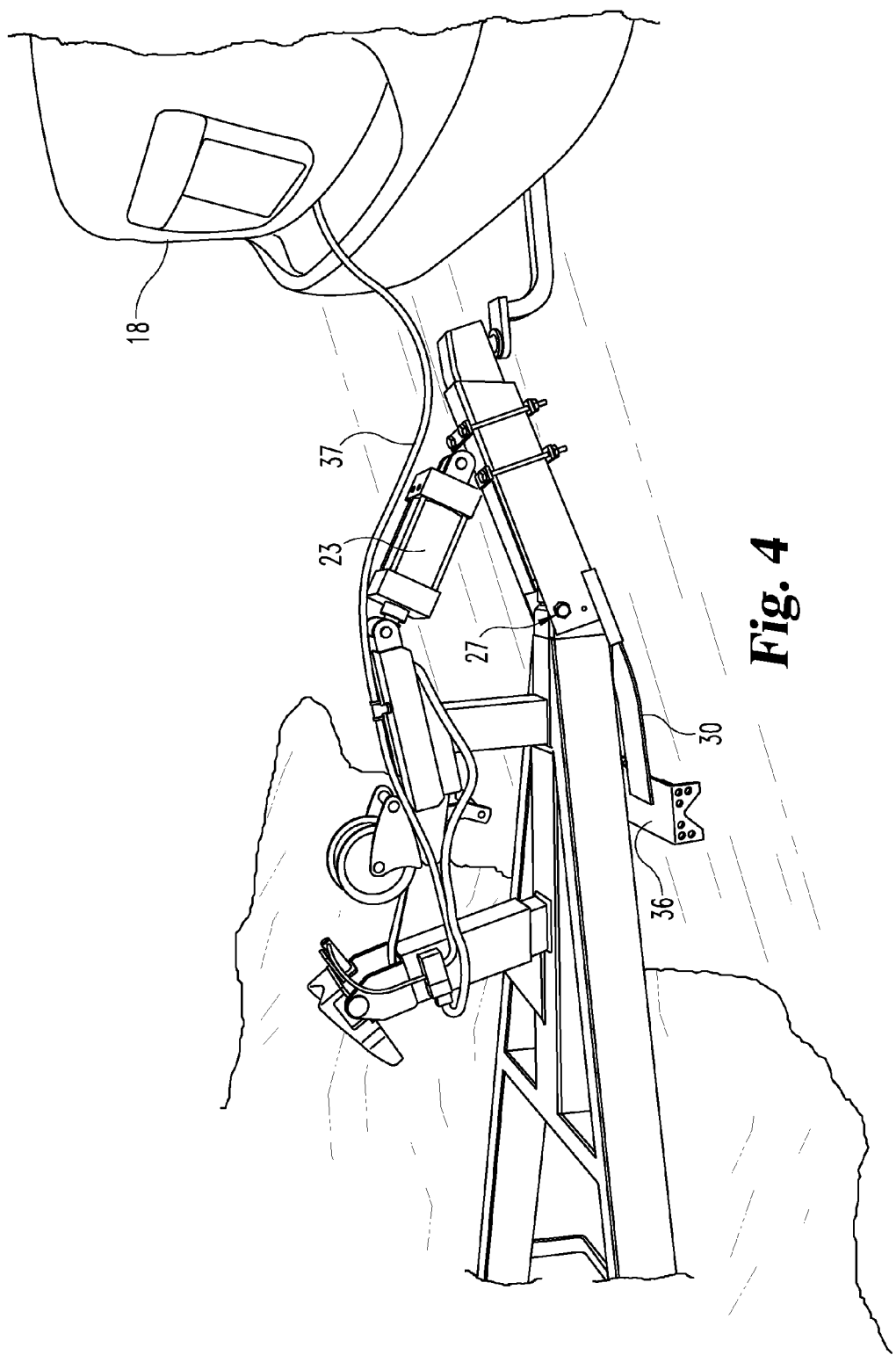
FIG. 4 is a partial, perspective view of the FIG. 1 floating boat trailer depicting the first step in the deployment.

Referring again to FIG. 1 and considering FIGS. 2, 3, and 4, when the boat 25 and trailer 20 are being towed, air pressure is applied to one end of air cylinder 23 and to the air springs 21 so that the air springs 21 and piston rod 26 are extended (see FIG. 3). Additionally, the air cylinder 23 and the air springs 21 act as shock absorbers that reduce the trailer hitch and ball bounce that can be caused by the flexing of the trailer frame.

One function of the trailer hinge is to move the trailer pivot point from the hitch ball to the hinge location 27. When preparing to load the boat 25 onto the trailer 20, the lower hinge bolt 28 (see FIG. 3) is removed prior to backing the trailer 20 into the water. The floatation panels 19 and the construction of trailer 20 allows the trailer to float on the surface of the body of water as the trailer 20 is backed into the water by the towing vehicle 18 (see FIG. 3). When the trailer hitch on the towing vehicle is approximately at the water's edge, the air solenoid valve is energized by a remote control transmitter and receiver 29 and this causes compressed air to be delivered to the opposite end of the air cylinder 23 and this retracts the piston rod 26 (see FIG. 5) and exhausts the air springs air supply. Retracting of the piston rod 26 lowers the hinged end of the trailer tongue into the water. The "front" section of the tongue is extended on the underside by spring steel plate 30, which extends toward the hinge location 27 and overlaps the hinge location 27. The construction of the disclosed structure includes the spring steel stabilizer blade 30 (see FIGS. 4, 6). As the hinge location 27 is lowered into the water, the stabilizer blade 30 is lowered into the water. The spring steel extension stabilizer blade 30 is forced to bend around the hinge when the cross member 36 contacts the bottom of the body of water by the action of the air cylinder or alternatively the cross member 36 applies pressure to the ramp surface (see FIG. 4). The use of stabilizer blade 30 is to prevent the floating trailer from moving or shifting sideways.

With the disclosed structure in this described state or condition, a boat can now be driven at idle speed onto the trailer and its forward movement is guided by the guide rails 33 and 33a and a pair of spaced-apart bunkers 33b that remain deployed above the surface of the body of water (see FIG. 2). When the boat keel contacts the center roller at the back of the trailer, the trailer is forced a few inches under water. Contact is maintained between the boat and trailer due to the upward floatation pressure. As the boat keel passes the forward end of the bunker rails, it contacts a guide roller 35 mounted on a spring steel plate that extends forward from a trailer cross member. The guide roller applies centering pressure to the keel as it is depressed and guides the keel mounted U-bolt into the auto latching device 34. Auto latching device 34 is described in U.S. Pat. No. 6,598,896, issued Jul. 29, 2003 to Hyslop. The '896 patent is incorporated by reference herein, in its entirety.

Figure 5:
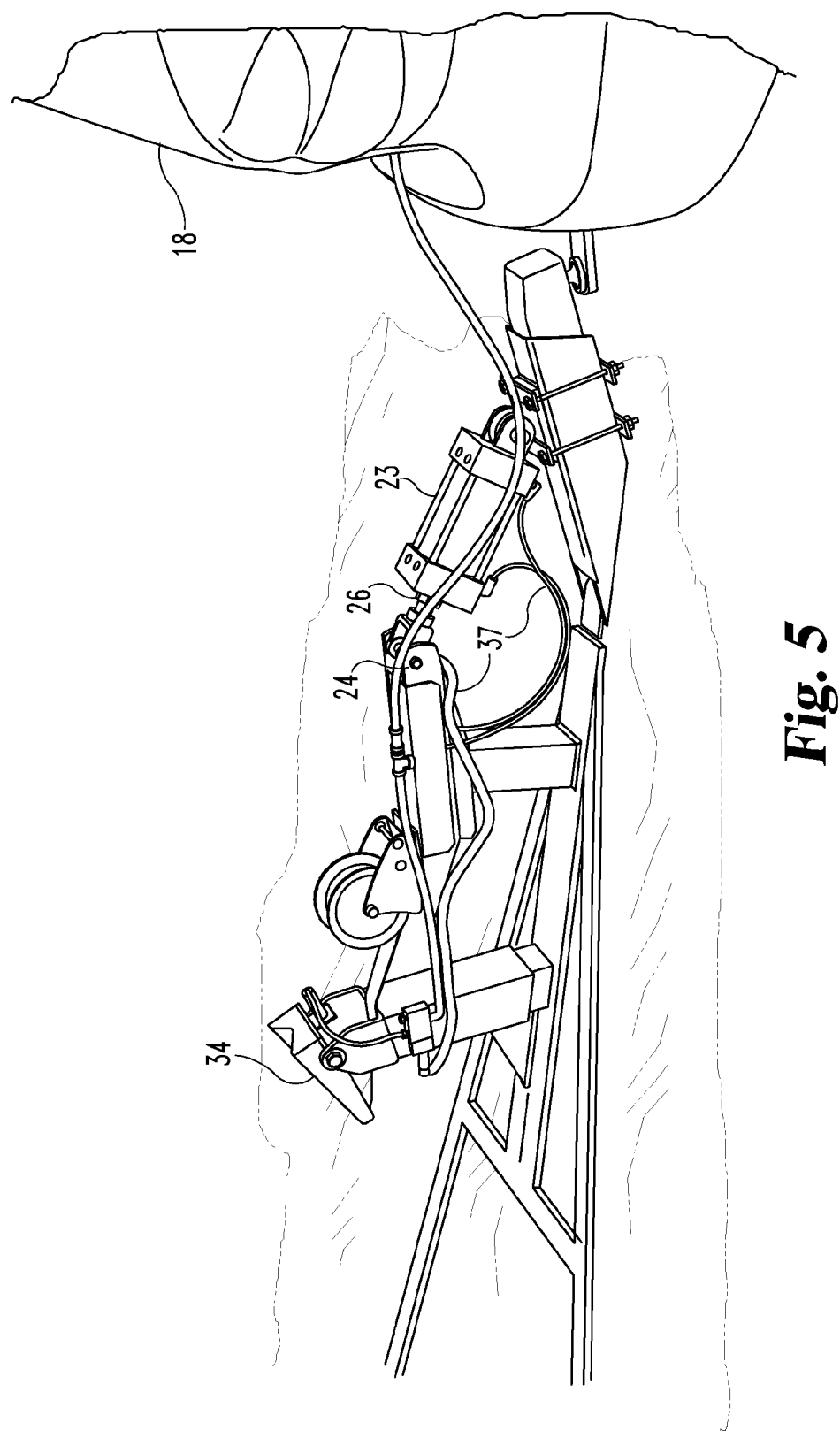
FIG. 5 is a partial, perspective view of the FIG. 1 floating boat trailer depicting the second step in the deployment process.

When the boat is fully forward on the trailer, it is secured by the automatic latching device 34 (see FIGS. 1, 5). Air pressure is now applied to the opposite end of the air cylinder and to the air springs. This extends the piston rod 26 and inflates the air springs 21, causing the trailer tongue to straighten (see FIG. 3) and thereby raising the boat. The boat and trailer can now be removed from the water. The lower hinge bolt 28 is now replaced (see FIG. 3), the winch strap and tie downs are attached, and the boat and trailer are then ready to travel.

When launching a boat, the tie downs and winch strap are removed. The floating boat trailer 20 is backed down the ramp into the water. The motor is started. A remote transmitter button is depressed, sending a signal to the receiver, which energizes the pneumatic solenoid valve, sending air pressure to the tongue mounted air cylinder, exhausting the air springs air, and the cylinder rod 26 is retracted. The cylinder action operates hinge location 27 and the stabilizer blade 30 cross member 36 contacts the ramp or the bottom of the body of water so as to keep the boat and trailer in position while unloading. The automatic latching device 34 is opened by depressing a hand-held transmitter, which energizes a pneumatic solenoid valve, that directs air pressure to the latching device air cylinder. Now the boat can be backed off the trailer under power and full control.

Figure 8:
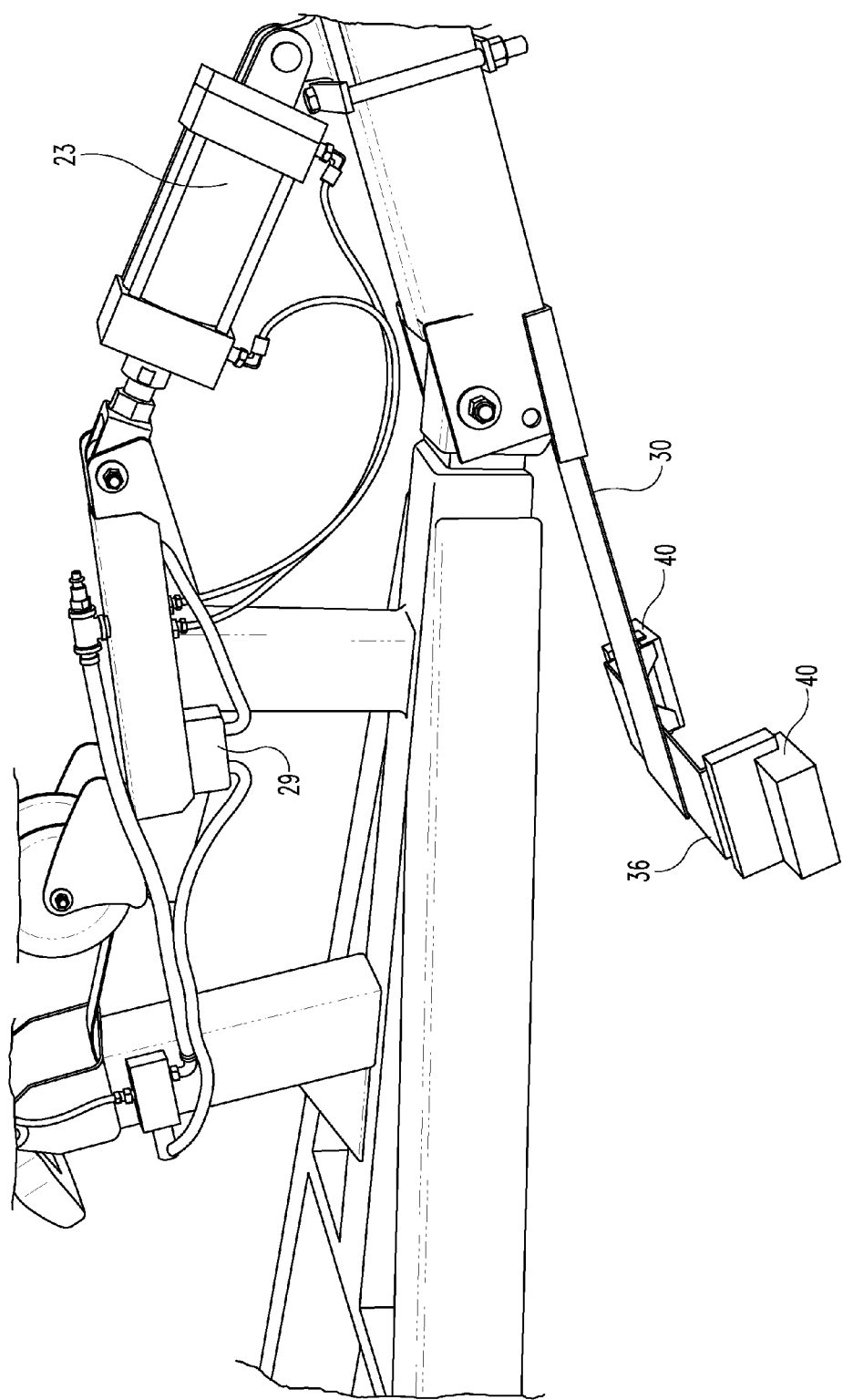
FIG. 8 is a partial, perspective view of an alternative stabilizer pad structure comprising part of the FIG. 1 floating boat trailer.

With regard to FIG. 8, an alternative design to the use of the spring steel stabilizer blade 30 is provided. The FIG. 8 embodiment contemplates the use of two spaced-apart stabilizer pads 40 that are mounted on the cross member 36 at the end of the spring steel tongue extension 30 and are constructed and positioned in the manner illustrated. It is contemplated that these two stabilizer pads 40 will also be controlled by air cylinder 23 and the spring steel tongue extension stabilizer pads will accommodate different surfaces and different depths.

Figure 9:
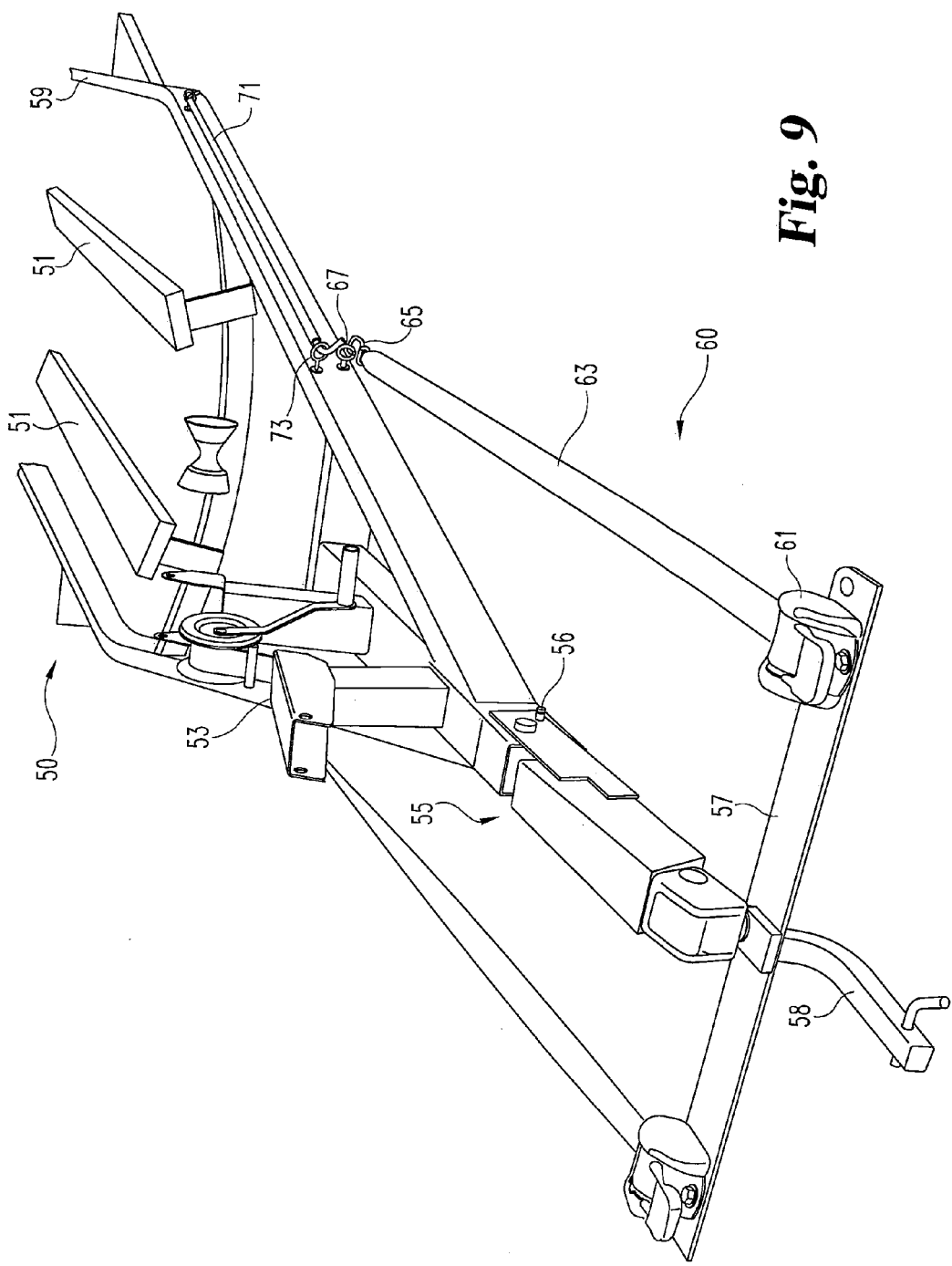
FIG. 9 is a perspective view of a floating boat trailer, without a boat thereon, according to another embodiment of the present disclosure.
Figure 10A:
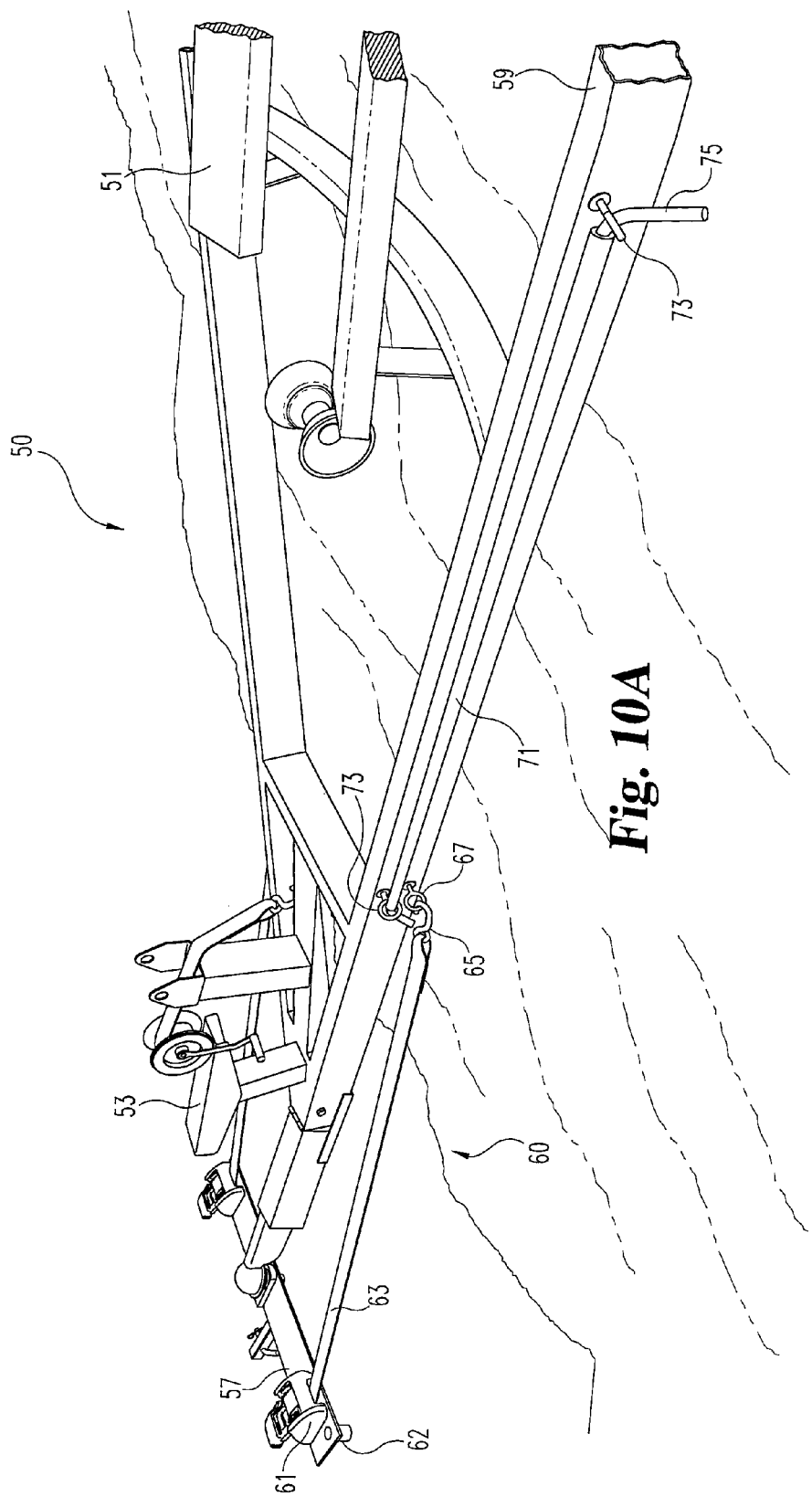
FIG. 10A is a partial, perspective view of the FIG. 9 floating boat trailer being deployed into the water.
Figure 10B:
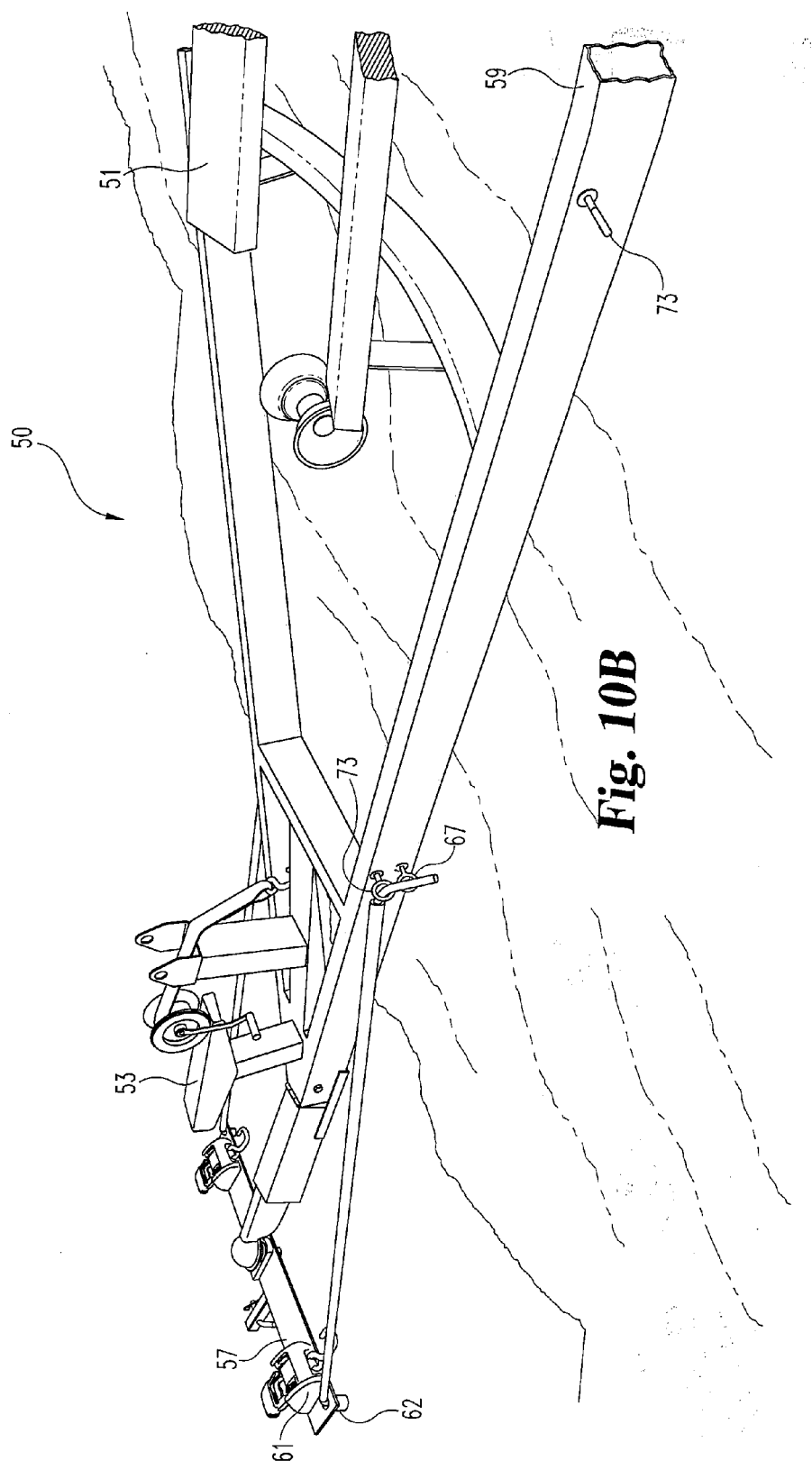
FIG. 10B is a partial, perspective view of the FIG. 9 floating boat trailer being deployed into the water.

With reference now to FIGS. 9, 10A, and 10B, there is illustrated a floating boat trailer 50 according to another embodiment. In many ways, boat trailer 50 is similar to boat trailer 20 described above; however, boat trailer 50 does not include the remote controlled pneumatic cylinder operation of the tongue hinge, automatic latching device 34 and air springs 21. As described above, stabilizer blade 30 of trailer 20 prevents the trailer from moving or shifting sideways. In this additional embodiment, the tongue stabilizer blade 30 is replaced with a stabilizing system 60, which includes, among other things, at least one spring biased buckle 61 and a stabilizer rod 71.

Boat trailer 50 is constructed of tubular metal material. Boat trailer 50 includes guide rails 51 and winch stand 53. As illustrated, the trailer is made of two portions that are pinned together at hinge location 55, which allow the two portions to move relative to one another. However, a lower hinge bolt 56 is provided to prohibit the pivoting movement of the two portions about hinge location 55. Boat trailer 50 is mounted to a hitch draw bar 58, which is connected to stabilizing plate 57. In the disclosed embodiment, stabilizing plate 57 measures 0.25 inches by 4 inches by 3 feet. Like boat trailer 20 of FIG. 1, boat trailer 50 includes at least two floatation panels.

Figure 11:
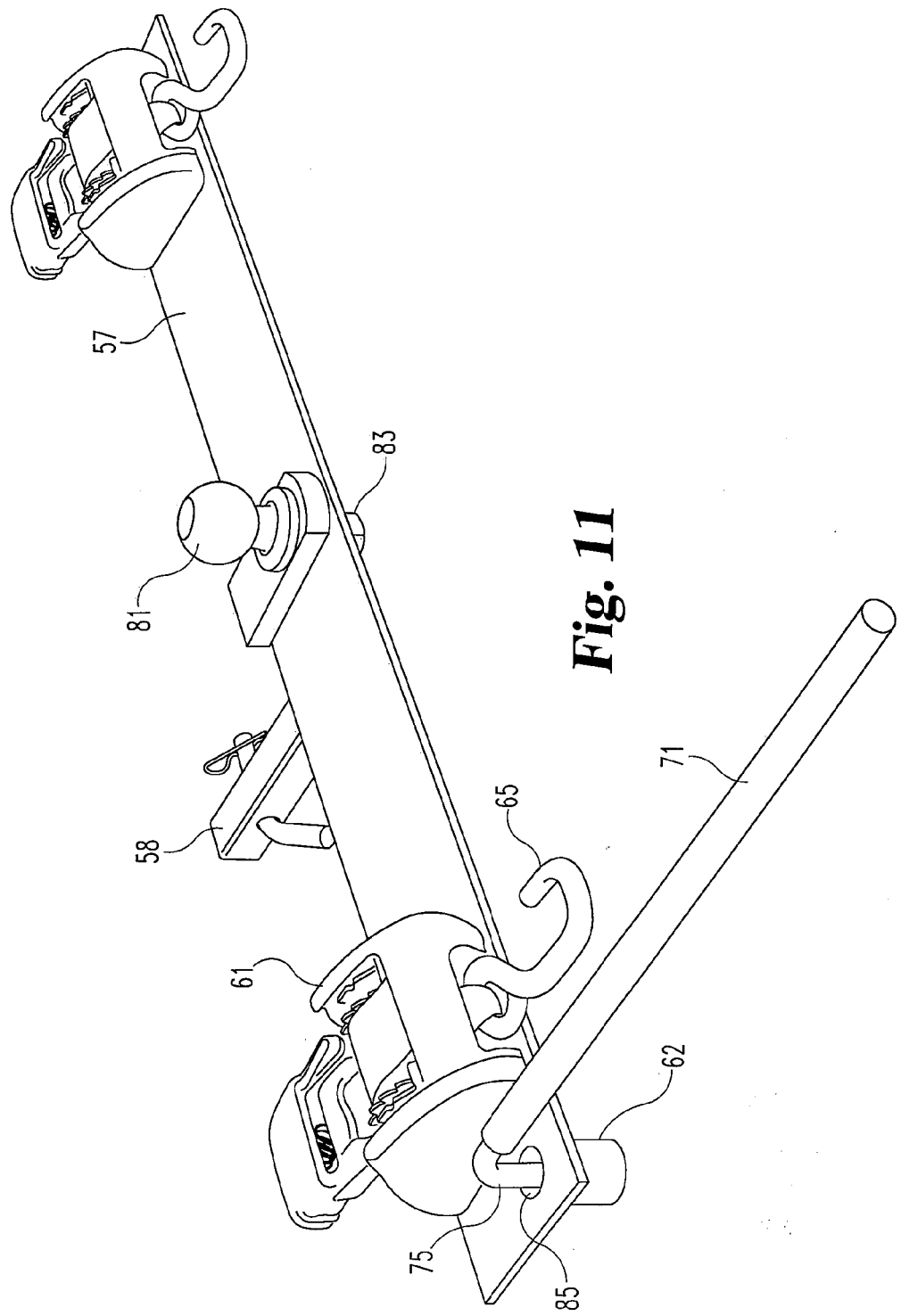
FIG. 11 is a partial, perspective view of a stabilizing plate comprising part of the FIG. 9 floating boat trailer.

Stabilizing plate 57 is fitted to the hitch draw bar 58 and held in place by a ball nut 83 (see FIG. 11). As noted, trailer 50 includes stabilizing system 60, which includes spring biased buckles 61 and stabilizer rod 71. A spring biased buckle 61 is mounted near each end of stabilizing plate 57. Each spring biased buckle 61 contains a strap 63 which has a mounting hook 65 at its distal end. The handle of spring biased buckle 61 dictates the operation of the buckle. When the handle is in its "up" position, strap 63 can freely extend from buckle 61; however, when the handle is in its "down" position, strap 63 is locked and prevented from extending from buckle 61.

Strap eyebolts 67 are fixedly attached to trailer frame 59. In the disclosed embodiment, strap eyebolts 67 are installed approximately 6 feet back from hinge location 55. As shown, the ends of stabilizer rod 71 are angled 75. Angled end portions 75 have a diameter less than the body portion of rod 71. While in storage, these angled rod portions 75 assist in holding rod 71 in place by a pair of rod eyebolts 73, which are fixedly attached to trailer frame 59 (see FIG. 10A). Additionally, as described in more detail below, angled rod portions 75 allow for stabilizing plate 57 to properly receive rod 71 when rod 71 is in use. In the disclosed embodiment, stabilizer rod 71 measures 6 feet in length and 1 inch in diameter.

Figure 12:
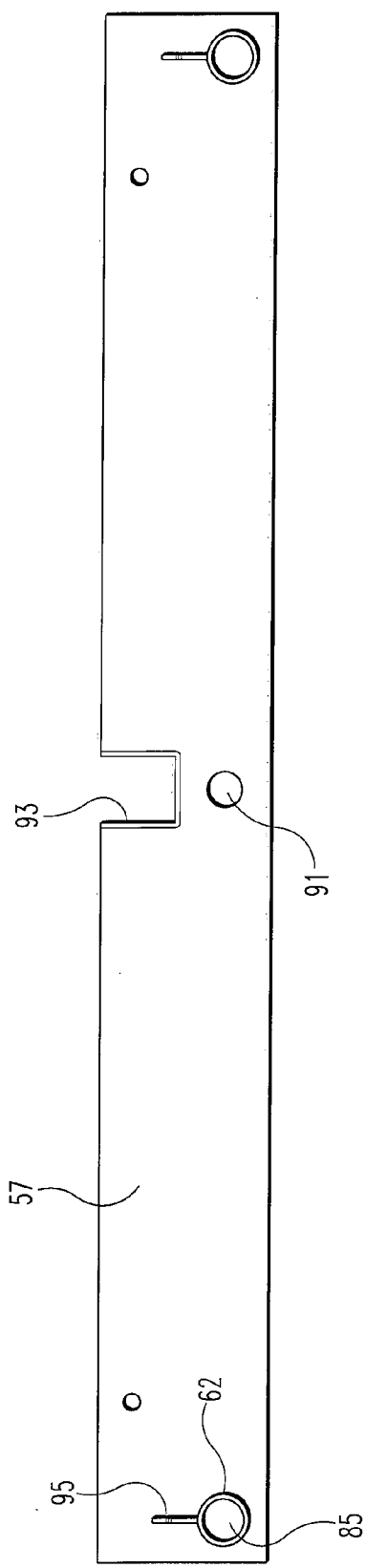
FIG. 12 is a bottom, plan view of the stabilizing plate of FIG. 11.
Figure 13:
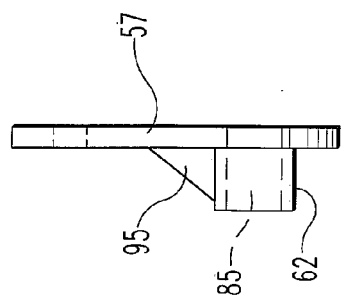
FIG. 13 is an end elevational view of the stabilizing plate of FIG. 12.
Figure 14:
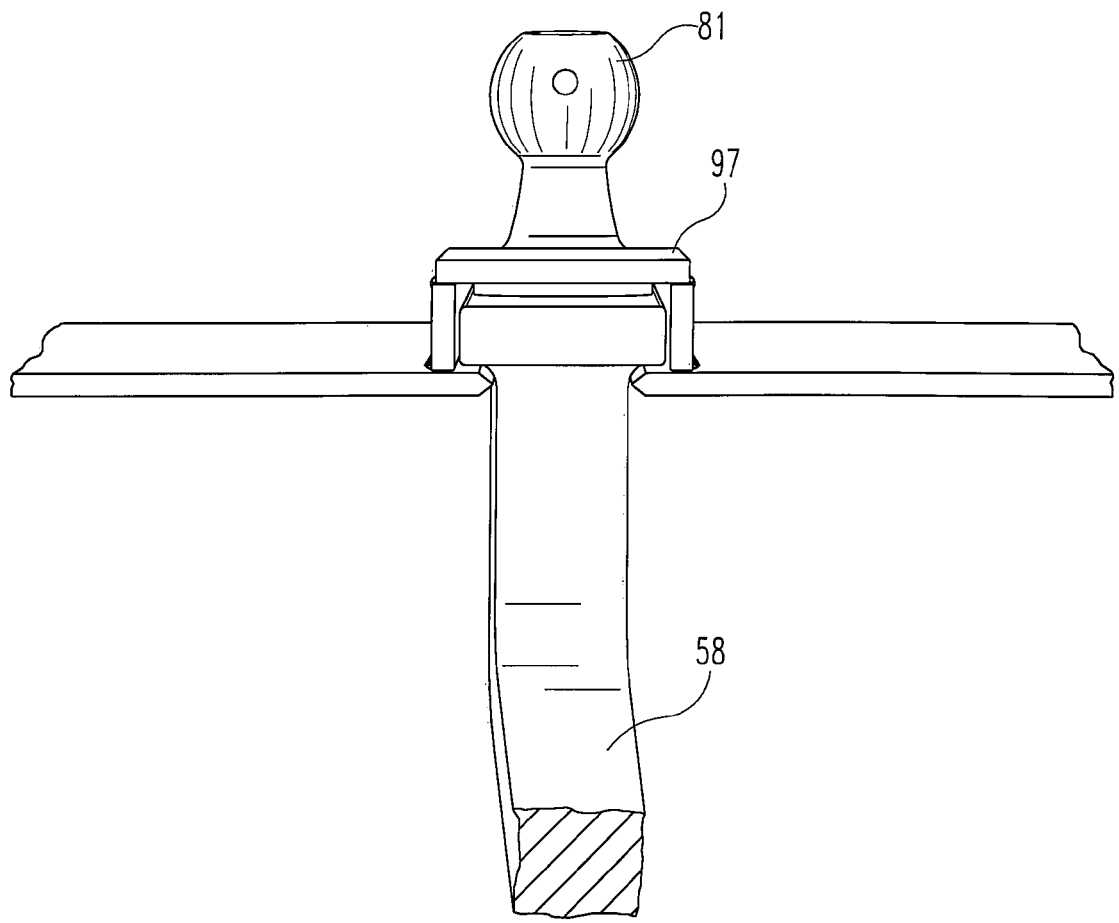
FIG. 14 is a partial, end elevational view of a hitch and plate assembly comprising part of the FIG. 9 floating boat trailer.
Figure 15:
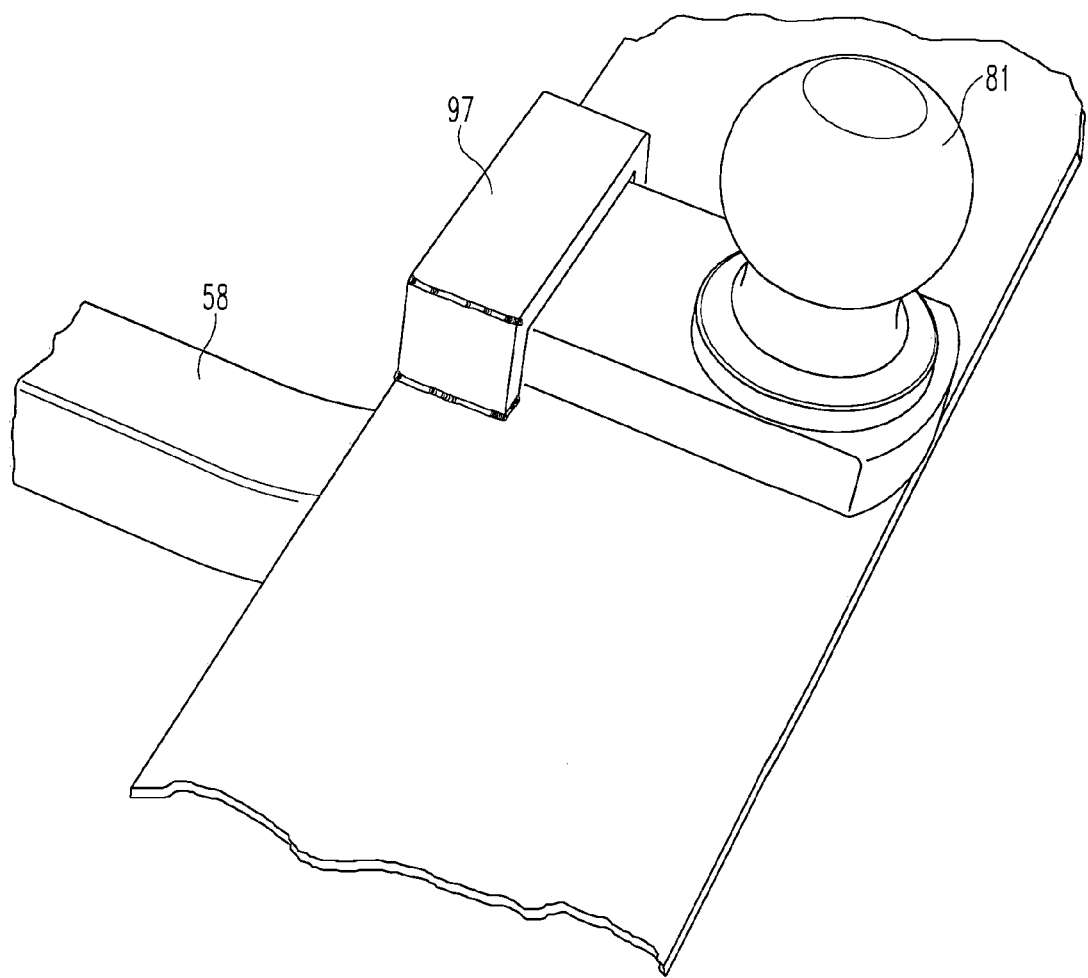
FIG. 15 is a partial, perspective view of the hitch and plate assembly of FIG. 14.

Referring more specifically now to FIGS. 11, 12 and 13, near each end of stabilizing plate 57 are holes 85. The depth of hole 85 is extended by attaching a pipe coupling 62 and a supporting brace 95. In one embodiment, pipe coupling 62 and brace 95 are welded to the underside of stabilizing plate 57, though other methods for affixing coupling 62 and brace 95 to plate 57 are contemplated. In the disclosed embodiment, hole 85 and pipe coupling 62 have a 0.75 inch diameter. Therefore, in the disclosed embodiment, angled portion 75 has a diameter of less than 0.75 inches in order for it to be received by hole 85 and pipe coupling 62. As noted above, stabilizing plate 57 is fitted to the hitch draw bar 58 and held in place by a ball nut 83. Recess 93 is dimensioned to properly receive hitch draw bar 58. Hitch draw bar 58 is set between ball hitch 81 and ball nut 83. Hitch mount 91 is dimensioned to properly receive a threaded rod having a length sufficient to extend through hitch draw bar 59, hole 91, and threaded onto ball nut 83. As shown in FIGS. 14 and 15, a drawbar cover 97 is welded to stabilizer plate 57 to reinforce plate 57 and compensate for recess 93.

As previously discussed, it is important to hold the boat trailer 50 against the wind, river currents and boat wakes when launching a boat into a lake or river. When the trailer wheels are in the water, but before the trailer 50 and boat are floating, the winch strap is disconnected from the boat. Then, the strap 63 from spring biased buckle 61 is extended and hook 65 is connected to strap eyebolt 67. Under normal conditions, the lock down feature of buckle 61 is enough to keep the trailer 50 in line with the towing vehicle (see FIG. 10A). However, certain winds or currents may require additional support to maintain such alignment. When necessary, stabilizer rod 71 can be installed on the down river side of the trailer outer frame 59 (see FIG. 10B). In this instance, one angled rod portion 75 is set into hole 85, while the other angled rod portion 75 is set into rod eyebolt 73. Stabilizer rod 71 holds against the current, while the strap 63 is pulling against the current on the other side of the trailer 50. When buckle straps 63 have been connected to strap eyebolt 67 and stabilizer rod 71 has been installed (if conditions require the use of rod 71), the trailer 50 and boat can then be backed into the water. Once the boat is floating, it may be backed away from the trailer under its own power and full control.

If trailer 50 is equipped with an automatic latching device 34 (as described hereinabove), the launching sequence is modified slightly. Again, when buckle straps 63 have been connected to strap eyebolt 67 and stabilizer rod 71 has been installed (if conditions require the use of rod 71), the trailer 50 and boat can then be backed into the water. To launch the boat, the automatic latching device 34 is shifted by depressing a hand-held transmitter, which energizes an electric solenoid that shifts the device to the launch-load position. With the boat no longer attached to the trailer, the boat motor can then be started and the boat backed off the trailer under power and full control.

When loading a boat, the boat trailer 50 is backed into the water. Before the trailer 50 is floating, a strap 63 is attached to each side of the trailer at strap eyebolt 67. A trailer jack roller (not shown) is lowered into the water and operated to remove pressure from the hinge bolt 56 so that it can be removed. The trailer jack roller is now retracted, which allows the hinge 55 to lower the trailer frame 59 into the water. The trailer can now be backed into the water and the boat loaded. A boat can now be driven at idle speed onto the trailer 50 and its forward movement is guided by guide rails 51 and guide roller 35 that remain deployed above the surface of the water. When the boat keel contacts the center roller at the back of the trailer 50, the trailer 50 is forced a few inches under the water. Contact is maintained between the boat and trailer due to the upward floatation pressure.

Once the boat is loaded, the trailer 50 is pulled out of the water a sufficient distance so that the trailer jack handle can be reached. The trailer jack roller is lowered until the hinge bolt 56 can be replaced, after which the jack is retracted to its up storage position. The winch strap of winch stand 53 is attached and the boat is secured. The boat and trailer can then safely be removed from the loading ramp. However, it is important that the straps 63 and stabilizer rod 71 be removed and the spring biased buckles 61 operated to retract the straps 63 before leaving the ramp area because the towing vehicle may not turn properly while they are installed.

Figure 16:
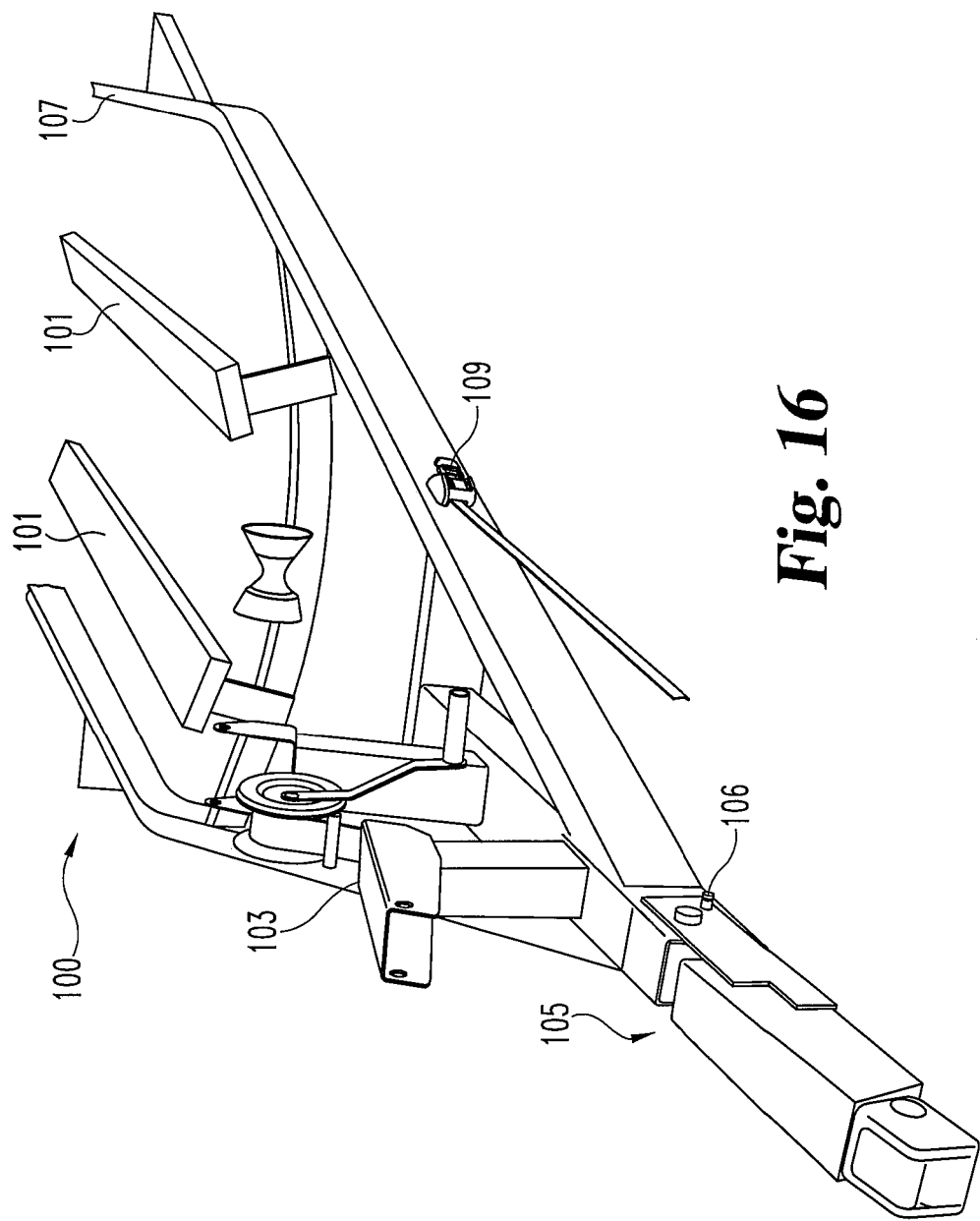
FIG. 16 is a perspective view of a floating boat trailer, without a boat thereon, according to another embodiment of the present disclosure.
Figure 17:
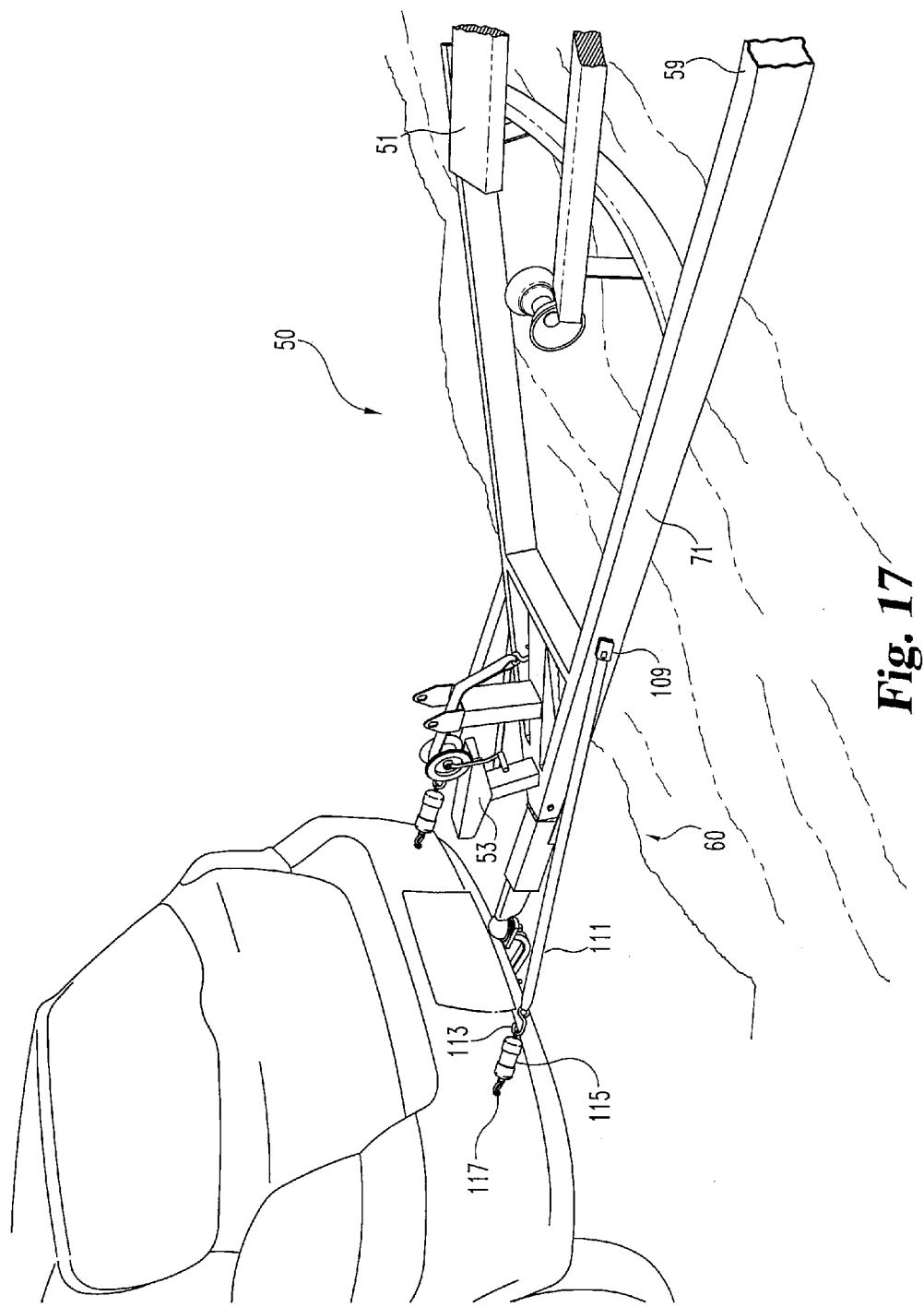
FIG. 17 is a partial, perspective view of the FIG. 16 floating boat trailer being deployed into the water.

With reference now to FIGS. 16 and 17, there is illustrated a floating boat trailer 100 according to a further embodiment. In many ways, boat trailer 100 is similar to boat trailer 50 described above. However, in this embodiment, boat trailer 100 does not include the stabilizing plate 57 mounted to hitch draw bar 58.

Boat trailer 100 is constructed of tubular metal material. Boat trailer 100 includes guide rails 101 and winch stand 103. As illustrated, the trailer is made of two portions that are pinned together at hinge location 105, which allow the two portions to move relative to one another. However, a lower hinge bolt 106 is provided to prohibit the pivoting movement of the two portions about hinge location 105.

A spring biased buckle 109 is attached on both sides of trailer frame 107. In one embodiment, the spring biased buckles 109 are installed approximately six feet back from hinge location 105. Each spring biased buckle 109 contains a strap 111 which has a mounting hook 113 at its distal end. The handle of spring biased buckle 109 operates the ratchet to remove any strap slack and dictates the operation of the buckle. When the handle is in its "up" position, strap 111 can freely extend from buckle 109; however, when the handle is in its "down" position, strap 111 is locked and prevented from extending from buckle 109.

As previously discussed, it is important to hold the boat trailer 100 against the wind, river currents and boat wakes when launching a boat into a lake or river. When the trailer wheels are in the water, but before the trailer 100 and boat are floating, the winch strap of winch stand 103 is disconnected from the boat. Then, the strap 111 from spring biased buckle 109 is extended and hook 113 is connected to a spring pod device 115, which is discussed in further detail below. The spring pod device 115 is in turn connected to a vehicle mount 117. As illustrated, spring biased buckle 109, strap 111, hook 113, spring pod device 115 and vehicle mount 117 work together to create a stabilizing system 120. In other embodiments, hook 113 may be directly connected to vehicle mount 117. Once strap 111 and spring pod device 115 have been put into place, trailer 100 and the boat can then be backed into the water. Once the boat is floating, it may be backed away from the trailer 100 under its own power and full control.

If trailer 100 is equipped with an automatic latching device 34 (as described hereinabove), the launching sequence is modified slightly. Again, when buckle straps 111 have been connected to spring pod device 115 and the spring pod device 115 has been connected to vehicle mount 117, the trailer 100 and boat can then be backed into the water. To launch the boat, the winch strap of winch stand 103 is first disconnected from the keel eye bolt. Next, start the boat motor. The automatic latching device 34 is shifted by depressing a hand-held transmitter, which energizes an electric solenoid that shifts the device to the launch-load position. With the boat no longer attached to the trailer, the boat can be backed off the trailer under power and full control.

When loading a boat, the boat trailer 100 is backed into the water. Before the trailer 100 is floating, buckle straps 111 are attached to a spring pod device 115, which is then connected to vehicle attachment 117. A trailer jack roller (not shown) is lowered into the water and operated to remove pressure from the hinge bolt 106 so that it can be removed. The trailer jack roller is now retracted, which allows the hinge 105 to lower the trailer frame 109 into the water. The trailer 100 can now be backed into the water and the boat loaded. A boat can now be driven at idle speed onto the trailer 100 and its forward movement is guided by guide rails 101 that remain deployed above the surface of the water. When the boat keel contacts the center roller at the back of the trailer 100, the trailer 100 is forced a few inches under the water. Contact is maintained between the boat and trailer due to the upward floatation pressure.

Once the boat is loaded, the trailer 100 is pulled out of the water a sufficient distance so that the trailer jack handle can be reached. The trailer jack roller is lowered until the hinge bolt 106 can be replaced, after which the jack is retracted to its up storage position. The winch strap of winch stand 103 is attached and the boat is secured. The boat and trailer can then safely be removed from the loading ramp. However, it is important that the spring biased buckles 109 are operated to retract the straps 111 before leaving the ramp area because the towing vehicle may not turn properly while they are installed.

As described above, hook 113 of strap 111 can directly attach to vehicle mount 117. However, when the boat is launched in high current conditions, the rigidity of stabilization system 120 can put a large amount of force on vehicle mount 117. Therefore, in the illustrated embodiment, spring pod device 115 is placed between strap 111 and vehicle mount 117. Spring pod device 115 provides a means to absorb, at least a portion, of those forces and they compensate for trailer to vehicle misalignment when the spring biased buckles 109 are in the lock down position or the trailer is being moved into or out of the water.

Figure 18:
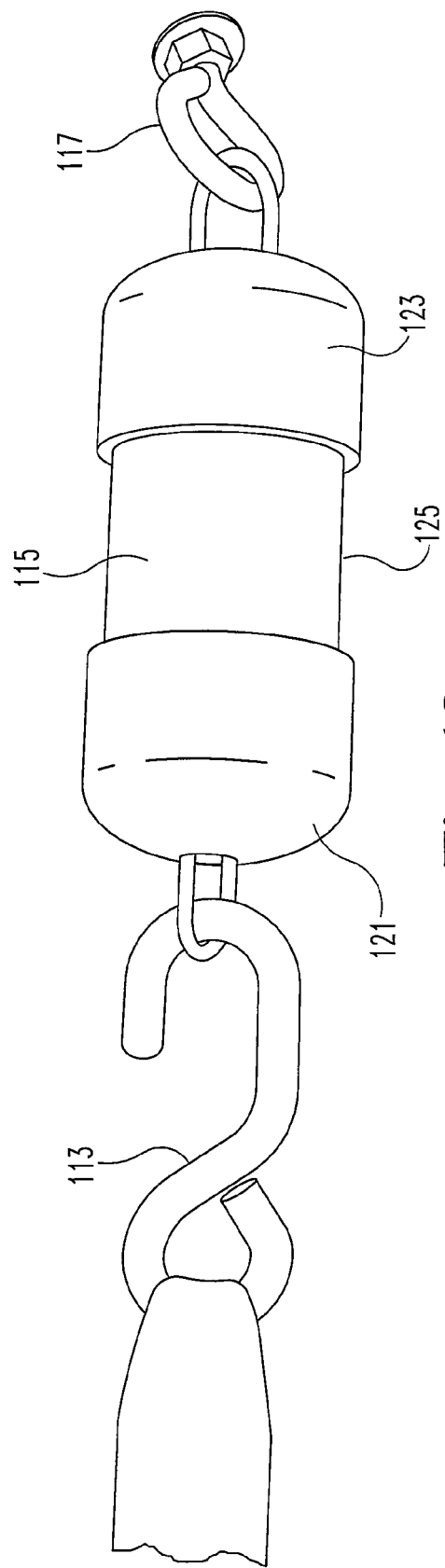
FIG. 18 is a top, plan view of the spring pod device depicted in FIG. 16.
Figure 19:
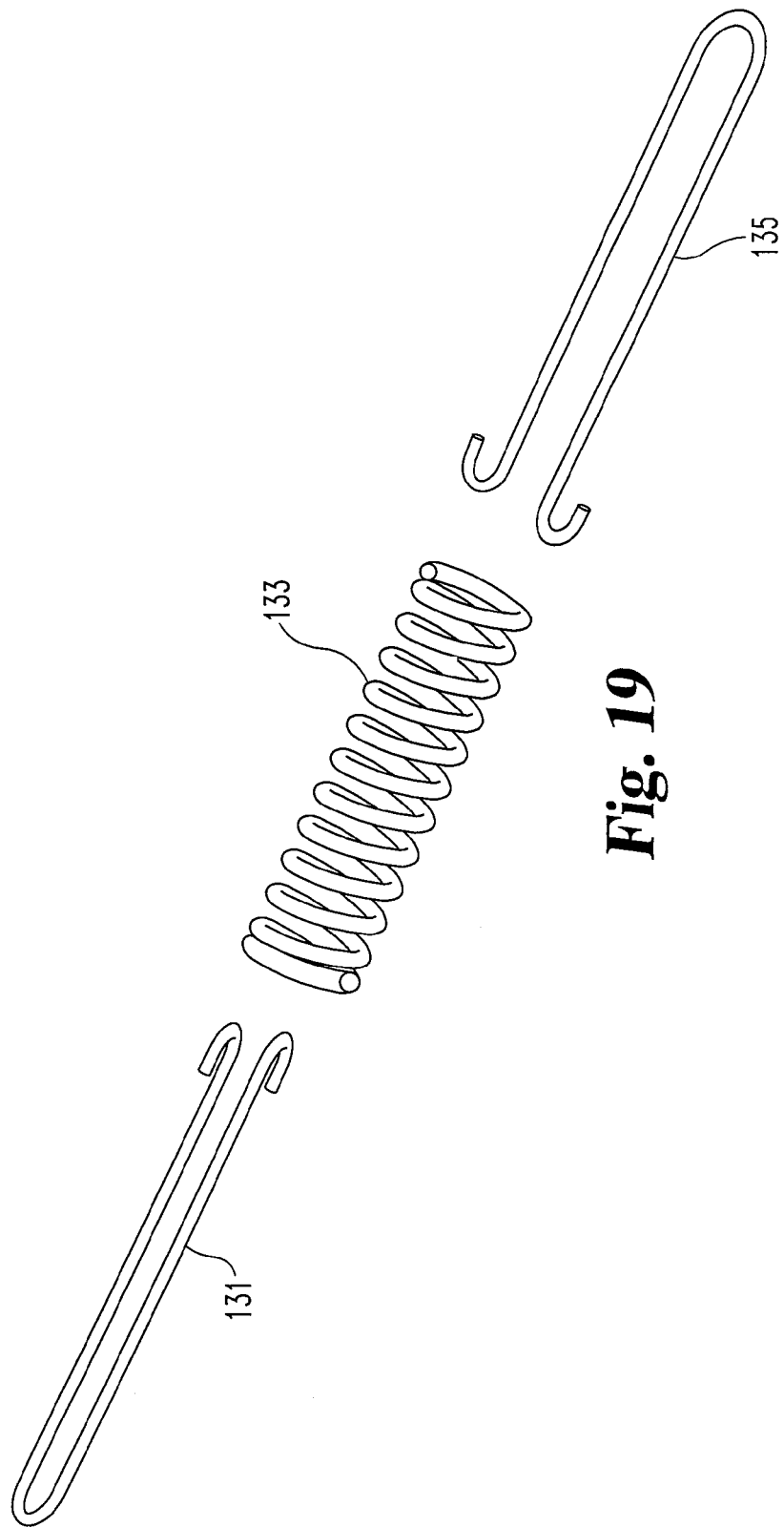
FIG. 19 is an exploded view of the components of the spring pod device.

Referring now to FIGS. 18 and 19, the outer portion of spring pod device 115 comprises a first cap 121, a second cap 123, and a housing 125. In one embodiment, caps 121, 123 and housing 125 are made of polyvinyl chloride. FIG. 19 provides an exploded view of the inner components of spring pod device 115. The inner components of spring pod device 115 comprise a first U-rod 131, a compression spring 133 and a second U-rod 135. In the illustrated embodiment, first U-rod 131 and second U-rod 135 have curved ends.

To create a counteracting unit, the open ends of U-rod 131, 135 are fed through opposite ends of compression spring 133. The curved ends of U-rods 131, 135 hold the U-rods in proper position and prohibit them from sliding back, through the compression spring 133. During use, hook 113 connects with the outer end of U-rod 131 and the outer end of U-rod 135 connects with vehicle mount 117. As will be appreciated by those of ordinary skill in the art, the counteracting forces exerted on the outer ends of U-rods 131, 135 are, at least partially, absorbed via the compression of compression spring 133. However, the tension of compression spring 133 still provides a considerable amount rigidity to stabilization system 120 and maintains trailer 100 substantially in line with the towing vehicle.

While the preferred embodiments have been illustrated and described in detail in the drawings and foregoing description, the same are to be considered as illustrative and not restrictive in character, it being understood that only the preferred embodiments have been shown and described and that all changes and modifications that come within the spirit of the invention are desired to be protected.

The invention claimed is:

1. A boat towing system for towing a boat behind a vehicle, said boat towing system comprising:
   a boat trailer comprising:
      a frame constructed and arranged with a first portion and a second portion that are pinned together to permit one section to move relative to the other section,
      a floatation means assembled to said boat trailer for enabling said second portion to float in water, and
      a spring biased buckle mounted on said second portion, said spring biased buckle having a strap which has a hooked portion on its distal end; and
   an attachment mount connected to said vehicle.

2. The both trailer system of claim 1, wherein said attachment mount is constructed and arranged to receive said hooked portion.

3. The boat trailer system of claim 1, further comprising a spring pod device, said spring pod device is constructed and arranged to receive said hooked portion, said spring pod device is constructed and arranged to attach to said attachment mount.

4. The boat trailer system of claim 3, wherein said spring pod device comprises a compression spring.

5. A boat towing system for towing a boat behind a vehicle, said boat towing system comprising:
   a boat trailer comprising:

a frame constructed and arranged in a first portion and a second portion that are connected together to permit said second portion to move relative to said first portion;

a floatation means assembled to said boat trailer for enabling said second portion to float in water; and, a stabilization means for maintaining said frame in line with the vehicle, said stabilization means comprise a spring biased buckle mounted on said second portion and an attachment mount connected to said vehicle, said spring biased buckle having a strap which has a hooked portion on its distal end.

6. The boat trailer system of claim 5, wherein the stabilization means further comprise a spring pod device, said spring pod device is constructed and arranged to receive said hooked portion, said spring pod device is constructed and arranged to attach to said attachment mount.

7. The boat trailer system of claim 6, wherein said spring pod device comprises a compression spring.

8. A method for launching a boat from behind a vehicle, the vehicle having an attachment mount, the method comprising the steps of:
   (a) providing a boat trailer comprising:
      a frame constructed and arranged in a first portion and a second portion that are connected together to permit one section to move relative to the other section; and
      floatation means assembled to said boat trailer for enabling said second portion to float in water;
   (b) providing a connecting means for connecting the trailer and the vehicle;
   (c) lowering the boat trailer into the water;
   (d) before said second portion begins to float in the water, attaching the connecting means;
   (e) continuing to back the boat trailer into the water such that said second portion floats in the water; and
   (f) backing the boat away from the trailer.

9. The method of claim 8, wherein the connecting means comprise a spring biased buckle mounted on the second portion, the spring biased buckle having a strap which has a hooked portion on its distal end.

10. The method of claim 9, wherein step (d) comprises attaching the hooked portion to the attachment mount.

11. The method of claim 9, wherein the connecting means further comprise a spring pod device.

12. The method of claim 11, wherein step (d) comprises attaching the hooked portion to the spring pod and attaching the spring pod device to the attachment mount.

13. The method of claim 12, wherein the spring pod device comprises a compression spring.

\* \* \* \* \*